(12) United States Patent
Haring

(10) Patent No.: US 9,771,658 B2
(45) Date of Patent: *Sep. 26, 2017

(54) HYDROGEN GENERATION AND CONTROL FOR INTERNAL-COMBUSTION VEHICLE

(71) Applicant: Christopher Haring, River Ridge, LA (US)

(72) Inventor: Christopher Haring, River Ridge, LA (US)

(*) Notice: Subject to any disclaimer, the term of this patent is extended or adjusted under 35 U.S.C. 154(b) by 176 days.

This patent is subject to a terminal disclaimer.

(21) Appl. No.: 14/886,732

(22) Filed: Oct. 19, 2015

(65) Prior Publication Data

US 2017/0107635 A1  Apr. 20, 2017

(51) Int. Cl.
| | |
|---|---|
| *F02B 43/08* | (2006.01) |
| *C25B 9/00* | (2006.01) |
| *C25B 15/02* | (2006.01) |
| *C25B 1/04* | (2006.01) |
| *C25B 15/08* | (2006.01) |
| *F02M 25/12* | (2006.01) |
| *B60K 35/00* | (2006.01) |
| *C25B 9/04* | (2006.01) |

(52) U.S. Cl.
CPC .............. *C25B 15/02* (2013.01); *B60K 35/00* (2013.01); *C25B 1/04* (2013.01); *C25B 9/04* (2013.01); *C25B 15/08* (2013.01); *F02M 25/12* (2013.01); *B60K 2350/1096* (2013.01)

(58) Field of Classification Search
CPC .... F02B 43/10; F02B 2043/106; F02B 43/02; F02D 19/0644; F02M 25/12; C25B 15/02; C25B 1/04; C25B 15/08; C25B 11/02; C25B 9/04; B60K 35/00; B60K 2350/1096
USPC ............................................... 123/3; 204/242
See application file for complete search history.

(56) References Cited

U.S. PATENT DOCUMENTS

| | | |
|---|---|---|
| 3,906,913 A | 9/1975 | Rupe |
| 4,031,865 A | 6/1977 | Dufour |
| 4,033,133 A | 7/1977 | Houseman |
| 4,141,326 A | 2/1979 | Wolber |
| 4,200,062 A | 4/1980 | Duckworth |
| 4,389,981 A | 6/1983 | Meyer |
| 4,416,224 A | 11/1983 | Hobby |
| 4,478,177 A | 10/1984 | Valdespino |
| 4,573,435 A | 3/1986 | Shelton |
| 4,750,453 A | 6/1988 | Valdespino |
| 5,085,176 A | 2/1992 | Brinkley |
| 5,119,768 A | 6/1992 | Russell |
| 6,257,175 B1 | 7/2001 | Mosher |
| 6,770,816 B2 | 8/2004 | Shotey |

(Continued)

*Primary Examiner* — Syed O Hasan
(74) *Attorney, Agent, or Firm* — Keaty Law Firm, LLC

(57) ABSTRACT

A method of safely generating hydrogen gas for use in motor vehicles to increase the performance and decrease the emissions of the internal-combustion engine of the motor vehicle, and of controlling the safe generation and use of hydrogen gas in motor vehicles, using a hydrogen generator having close-spaced metal electrolysis plates in the generator housing, configured to inject hydrogen into the intake manifold or alternatively into the combustion chamber, and a control system monitoring and controlling gas level, liquid levels, temperature, pressure, flow rate, electric current, and tachometer, with monitoring and overriding control from the cab of the vehicle.

9 Claims, 13 Drawing Sheets

(56) References Cited

U.S. PATENT DOCUMENTS

| | | |
|---|---|---|
| 7,191,737 B2 | 3/2007 | Klein |
| 7,475,656 B2 | 1/2009 | Yatsenko |
| 7,654,233 B2 | 2/2010 | Lin |
| 8,100,092 B2 | 1/2012 | McBride |
| 8,163,142 B1 | 4/2012 | Stama |
| 8,186,315 B2 | 5/2012 | Jeffs |
| 8,464,667 B1 | 6/2013 | Stama |
| 8,561,578 B2 | 10/2013 | Miyagawa |
| 8,757,107 B2 | 6/2014 | Owens |
| 8,869,755 B2 | 10/2014 | Shmueli |
| 9,051,872 B2 | 6/2015 | Monros |
| 2008/0047830 A1 | 2/2008 | Fairfull et al. |
| 2010/0049417 A1 | 2/2010 | Bailey |
| 2010/0089341 A1 | 4/2010 | Richardson |
| 2010/0180838 A1 | 7/2010 | Lewis |
| 2011/0212375 A1 | 9/2011 | Taguchi et al. |
| 2011/0220039 A1 | 9/2011 | Nowicki |
| 2011/0253070 A1 | 10/2011 | Haring |
| 2012/0067021 A1* | 3/2012 | Aggelopoulos ............ C25B 1/08 60/39.12 |
| 2012/0234265 A1* | 9/2012 | Ball .......................... C25B 1/08 123/3 |
| 2014/0096728 A1 | 4/2014 | Ortenheim |
| 2014/0202401 A1 | 7/2014 | Kuo |
| 2014/0216366 A1 | 8/2014 | Monros |

* cited by examiner

HYDROGEN GENERATION AND CONTROL FOR INTERNAL-COMBUSTION VEHICLE

BACKGROUND OF THE INVENTION

This invention provides a method of safely generating hydrogen gas for use in motor vehicles to increase the performance and decrease the emissions of the internal-combustion engine of the motor vehicle, and a method of controlling the safe generation and use of hydrogen gas.

Federal regulations require that automobile manufacturers improve fuel efficiency and emissions control. The addition of hydrogen gas and oxygen gas to the fuel system of an internal combustion engine is known to improve fuel efficiency and decrease the emission of undesired pollutants. These benefits are thought to be the result of more complete combustion induced by the presence of hydrogen in fuel, as a consequence of which efficiency increases, while dangerous emissions with soot and carbon monoxide decrease.

The hydrogen and oxygen may be generated through electrolysis of an aqueous solution with the gases given off being mixed with the fuel and air supplied to the engine. The hydrolysis of water is known to produce both hydrogen gas and oxygen gas. The generation of small quantities of hydrogen and oxygen using one or more electrolysis cells with the hydrogen and oxygen generated then being combined with the usual air/fuel mixture to improve the efficiency of internal combustion engines has been proposed in a number of published documents.

The car industry produced hydrogen devices called electronic fuel injection enhancers (EFIE) that can be used for retrofitting a car. Basically, they use the process of electrolysis to introduce a small amount of hydrogen gas to the air that's already being drawn into the engine. As a result, the mix of air/hydrogen gas causes greater ignition and burns much better. This gives higher fuel efficiency and in some cases can actually cause the exhaust coming out of the engine to be more oxygen rich and cleaner, taking away the need for a catalytic converter. The electricity needed for the electrolysis is drawn off of the car's alternator to create what is called HHO, or oxohydrogen, or brown gas.

Since hydrogen is flammable, care should be exercised when retrofitting a vehicle with a hydrogen generator. The present invention contemplates provision of a hydrogen generator for use with a vehicle powered by a combustion engine that can be safely installed on a vehicle to improve fuel efficiency and decrease harmful emissions.

There is a need for a hydrogen generating apparatus that can be incorporated into a vehicle motor system in a safe and efficient manner.

There is a need for a hydrogen generating apparatus that incorporates closely-spaced electrode cells for increased rate of separation of oxygen and hydrogen in water molecules, in order to increase portability, efficiency, and safety when used in vehicles.

There is a need for a control system to regulate and adjust the production and use of highly explosive hydrogen and oxygen in a vehicle.

SUMMARY OF THE INVENTION

The present invention provides a method of safely generating hydrogen gas for use in motor vehicles to increase the performance and decrease the emissions of the internal-combustion engine of the motor vehicle, and of controlling the safe generation and use of hydrogen gas in motor vehicles, using a hydrogen generator having close-spaced metal electrolysis plates in the generator housing, configured to inject hydrogen into the intake manifold or alternatively into the combustion chamber, and a control system monitoring and controlling gas level, liquid levels, temperature, pressure, flow rate, electric current, and tachometer, with monitoring and overriding control from the cab of the vehicle.

The present invention solves existing problems of providing safe and efficient generation and use of explosive hydrogen for moving vehicles.

BRIEF DESCRIPTION OF DRAWINGS

Reference will now be made to the drawings, wherein like parts are designated by like numerals, and wherein.

DETAILED DESCRIPTION OF THE INVENTION

Figure 1:
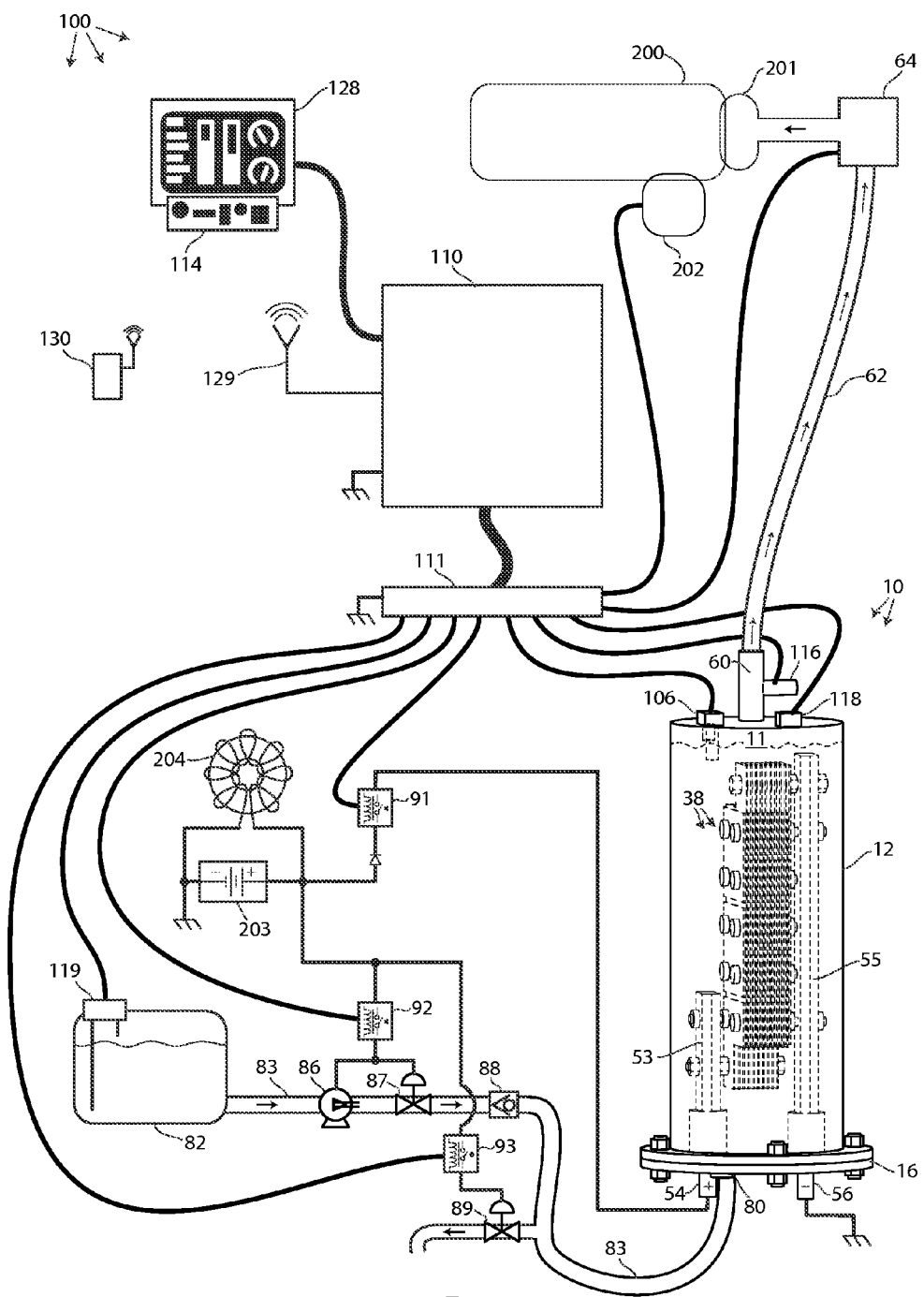
FIG. 1 is a schematic view of the hydrogen-generating-and-control system of the present invention.

Referring to FIG. 1, a schematic of the hydrogen-generating-and-control system 100 using the hydrogen generating apparatus, the internal-combusting engine 200 of a vehicle, through the fuel-intake manifold 201 of the engine or by optional alternate means of injection through spark-plug ports or through multiport fuel injectors, is provided with hydrogen gas through a hydrogen injector 64 supplied through a hydrogen conduit 62 by a hydrogen generator 10 that electrolytically generates hydrogen gas from water. Electric current for the electrolysis is provided by the vehicle's battery 203 and alternator 204 or similar sources, to an anode rod 54 of the hydrogen generator 10, through an electrolytic plate assembly 38 immersed in water, and then through a cathode rod 56 to the vehicle's common electric chassis ground to complete the circuit. Separated hydrogen gas collects in the inner chamber 11, above the water level, and is delivered to the hydrogen injector 64 through the hydrogen conduit 62.

The operation of the hydrogen generator 10 and the hydrogen-generating-and-control system 100 are under the control of the system controller 110, receiving signals from and sending signals to a variety of sensors and actuators or relays through a controller manifold 111, including communication with the engine control unit (ECU) 202 of the vehicle's engine. The system controller displays information on an in-cab display 128, and is subject to overriding control from an in-cab console 114. For safety reasons, overriding control should normally be limited to safe parameters and combinations of parameters in order to prevent explosion or catastrophic failure resulting from operator error.

Figure 2:
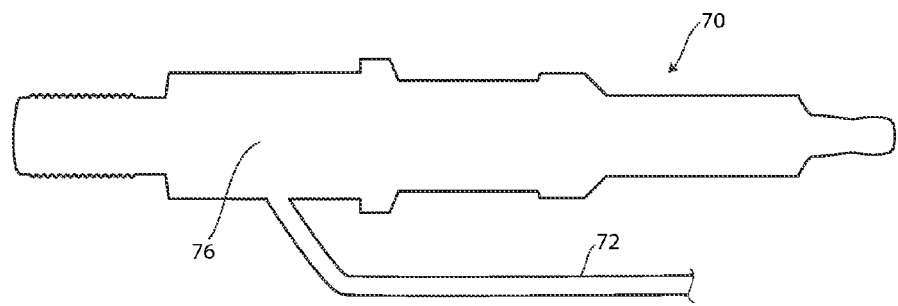
FIG. 2 is a section view of the optional modified spark plug of an embodiment of the present invention.
Figure 3:
FIG. 3 is a section view of a gas tube optionally used with an embodiment of the present invention.

Referring now to FIG. 2 & FIG. 3, in an embodiment of the invention, the generated hydrogen gas can be introduced directly into the cylinders of the engine through gas tubes 72 into extender sleeves 76 for spark plugs 70. A one-way check valve can be incorporated into the gas tubes 72 by providing a narrowed portion 73 of the tube, and a spring-returning ball 74 to stop the reduced-diameter opening 75 created by the narrowed portion 73 whenever the pressure in the cylinder becomes greater than the pressure in the gas tube 72, such as during ignition and combustion inside a particular cylinder. In this embodiment, the function of the hydrogen injector 64 is divided among and located near each individual spark plug and cylinder. Hydrogen is injected into the spark plug port, through a channel and one way valve and exits next to the spark gap. This is done at the same time the spark is engaging, thus causing a rapid and hot detonation causing the fuel to rapidly, completely, and efficiently burn. In this embodiment, hydrogen is sprayed on the tip of the spark plug during the spark phase. By doing this the ignition spark is raised from 0.001 Joules to a magnitude of 10 Joules, which is far superior to any spark enhancing method known today.

Figure 4:
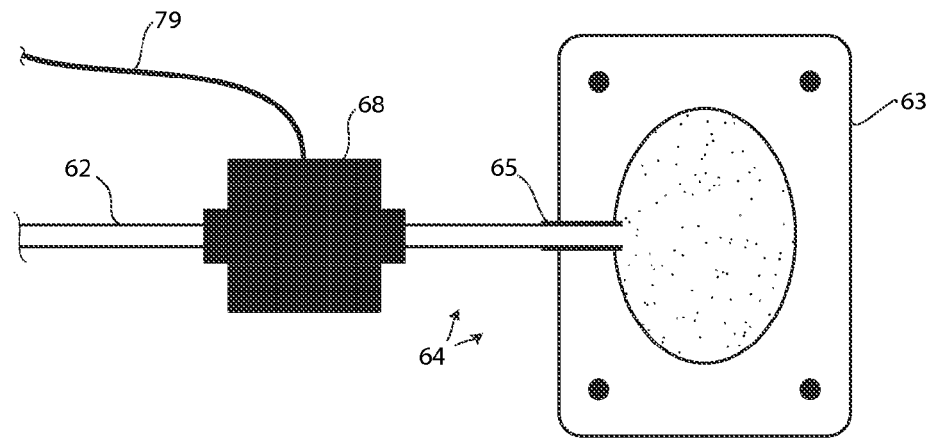
FIG. 4 is a schematic view of an embodiment of the hydrogen injector of the present invention.

Referring to FIG. 4, in another embodiment of the invention, hydrogen gas can be injected into the intake manifold at the throttle body, for carburetor or single-point or central-port fuel injection systems, or directly into each cylinder for multiport fuel injection systems, through one or more throttle spacers 63 having hydrogen nozzles 65. In such an embodiment, the function of the hydrogen injector 64 is performed by either a single or multiple throttle spacers 63 with hydrogen nozzles 65, with the generated hydrogen injected either into the intake manifold or optionally directly into each cylinder for multiport fuel injection systems.

In both embodiments, the hydrogen injector 64 is supplied with generated hydrogen gas from the hydrogen conduit 62, regulated by an appropriate number of gas-flow valves 68 under the control of the system controller 110 through a control-signal line 79.

The closer to the ignition point that the hydrogen is injected, the less hydrogen is consumed to achieve the results. The hydrogen detonates in 3 milliseconds which accelerates the burning of the gasoline, diesel and so on. The slower type burning fuel such as diesel will produce a higher efficiency number compared to gasoline. Natural gas will produce better numbers than diesel or gasoline. This acceleration of burning the fuel generates more horse power, increases torque and fuel mileage of the vehicle, while reducing harmful emissions. The preliminary tests showed that the slower burning type of fuel is used by the vehicle, the better the affect the hydrogen has on that fuel. For instance, diesel-powered vehicles achieve a better efficiency level than gasoline-powered engine because diesel naturally burns slower than gasoline. Therefore, when hydrogen that detonates at 3 milliseconds is added to these fuels it raises their burn rate thus getting more efficiency out of the fuels.

Figure 5:
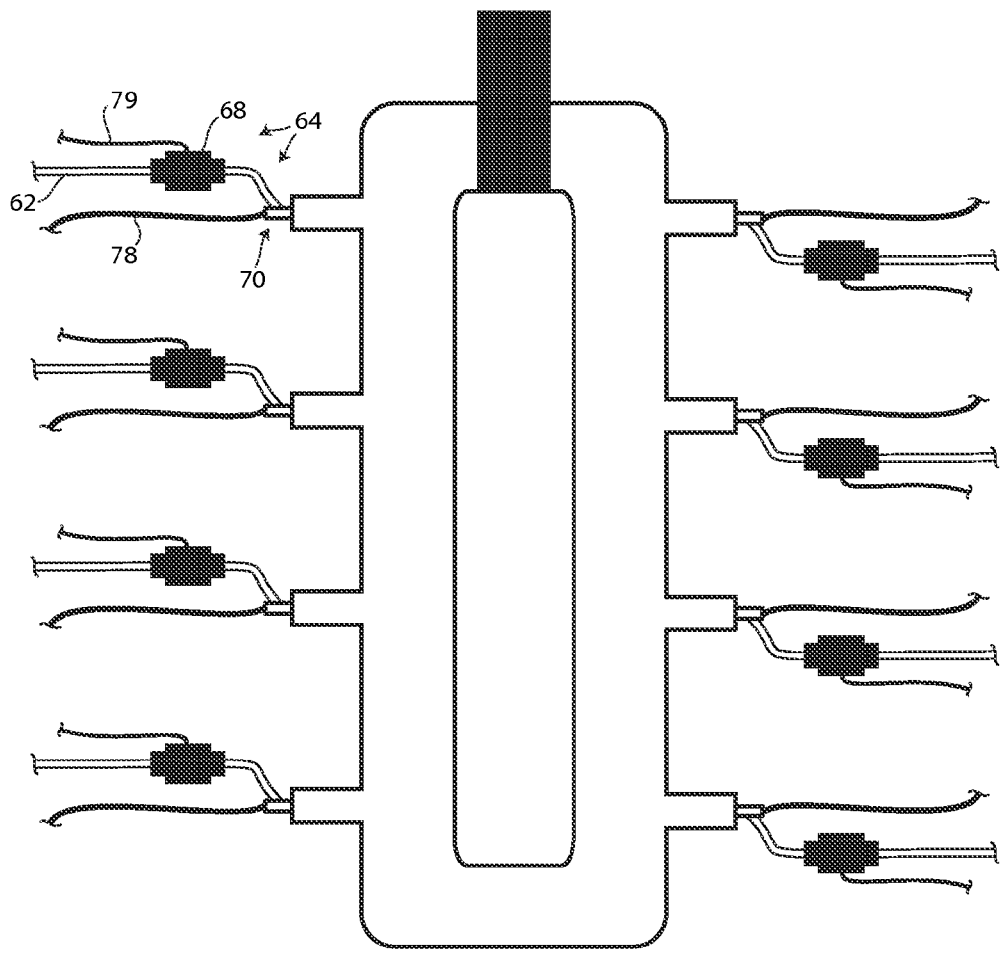
FIG. 5 is a schematic view of another embodiment of the hydrogen injector of the present invention.

Referring now to FIG. 5, a schematic representation of an 8-cylinder engine, having 8 spark plugs 70 and 8 spark-plug wires 78, where generated hydrogen gas is to be injected separately into each cylinder either through an optional spark plug extender sleeve or through optional injection near or directly into each cylinder, each hydrogen injector 64 supplies generated hydrogen gas from the hydrogen conduit 62, regulated by a gas-flow valve 68 under control of the system controller 110 through a control-signal line 79.

Figure 6:
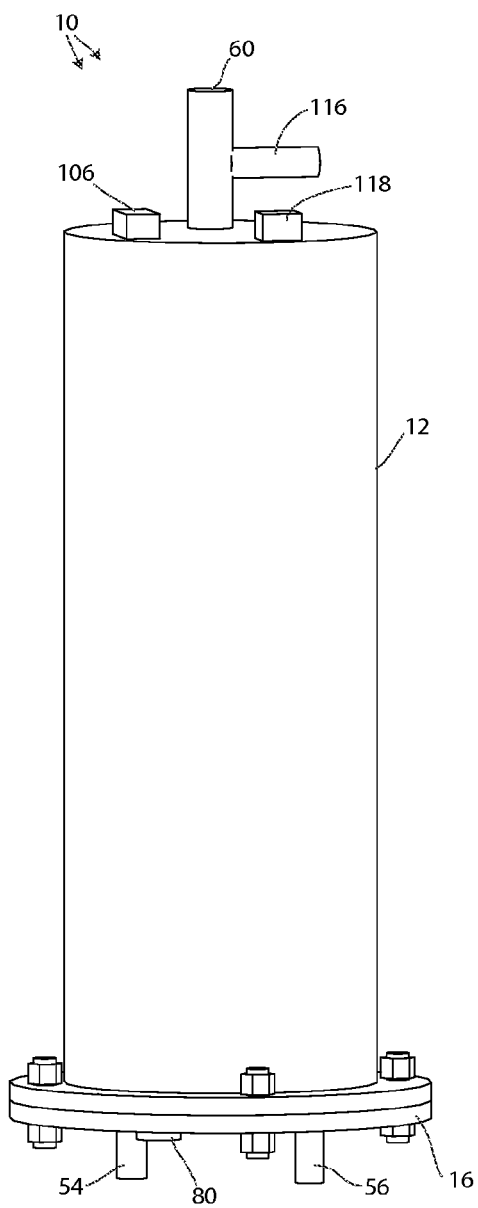
FIG. 6 is a perspective view of the hydrogen generator of an embodiment of the present invention.
Figure 7:
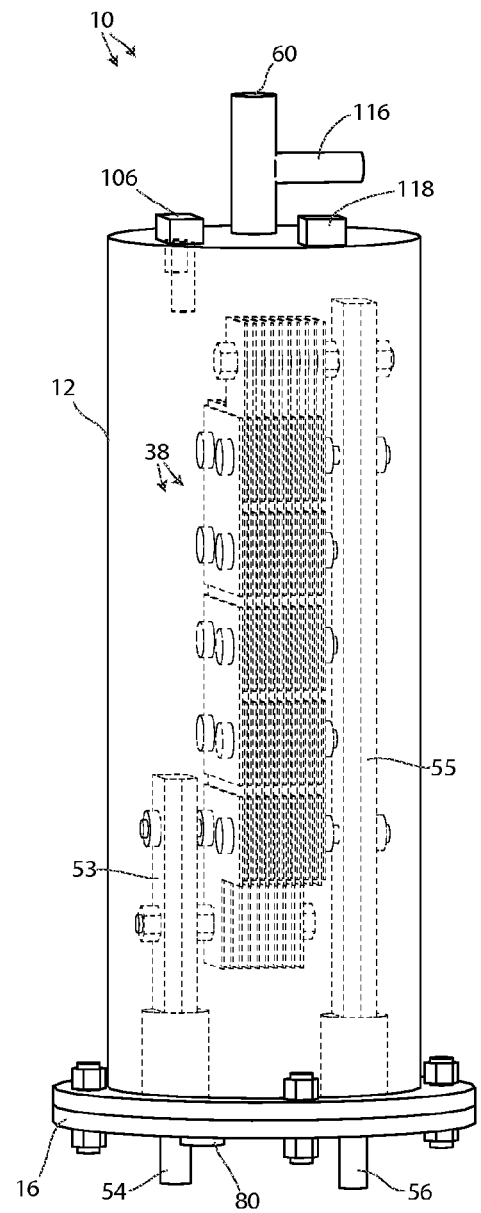
FIG. 7 is a perspective view with hidden internal structures of the hydrogen generator of an embodiment of the present invention.
Figure 8:
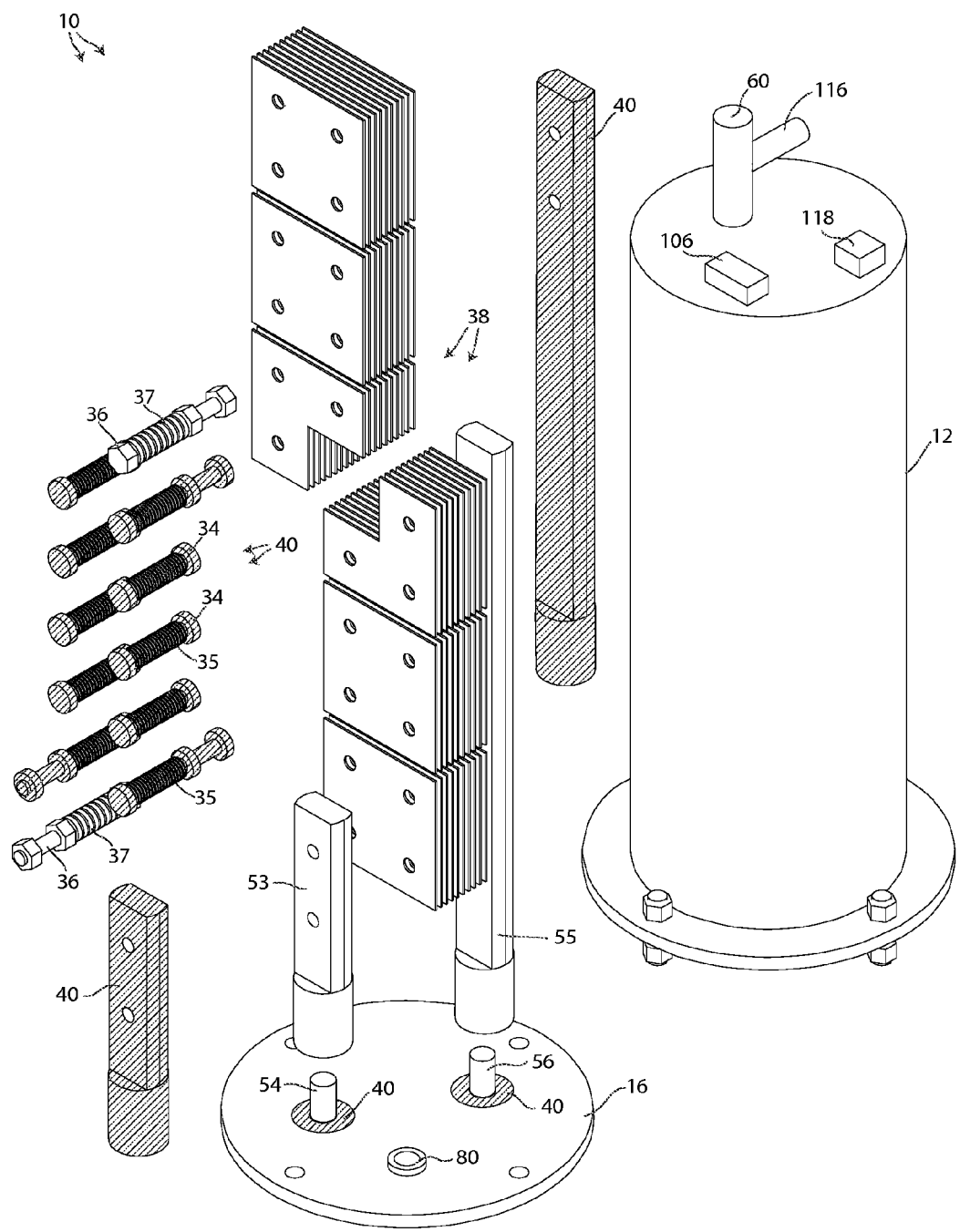
FIG. 8 is an exploded view of the hydrogen generator of an embodiment of the present invention.
Figure 9:
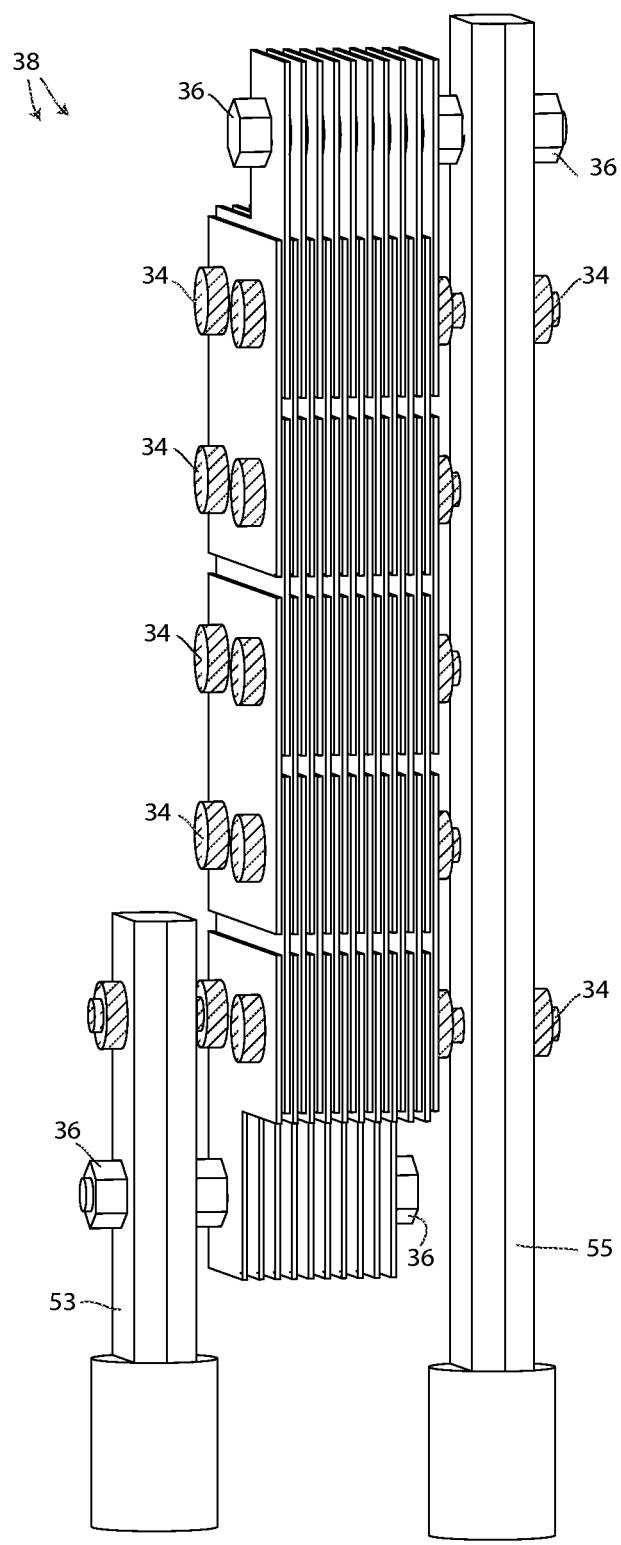
FIG. 9 is a perspective view of the internal structures of the hydrogen generator of an embodiment of the present invention.

Referring now to FIG. 6 & FIG. 7, in an embodiment of the hydrogen generator 10 of the present invention, a generator housing 12 defines an inner chamber 11 that is capable of holding water-electrolyte and holding hydrogen gas under pressure. The hydrogen gas will separate from and rise above the water-electrolyte and will occupy the top portion of the inner chamber 11. The generator housing is sealed by a cover section 16 having a water port 80 for bringing water into or out of the hydrogen generator 10, and through which pass an anode rode 54 and a cathode rod 56, allowing electrical connection of the hydrogen generator 10 unit to the hydrogen-generating-and-control system 100 installed in a vehicle.

The top of the housing 12 has a gas outlet 60 through which generated hydrogen gas is sent via the hydrogen conduit 62 to the hydrogen injector 64. Also mounted on the housing 12 are a water-level high-low sensor 106 monitoring whether the generator is under-filled or over-filled, a gas-pressure sensor 116 monitoring the pressure at the entrance to the hydrogen conduit 62, and a generator temperature sensor 118 monitoring the temperature inside the housing.

The housing 12 contains an electrolytic plate assembly 38 structurally supported by, and in electrical contact with, an anode supporting conductor 53 and a cathode supporting conductor 55, which are electrically insulated from the inner chamber 11 on the greater part of their outside, exposed surfaces, but are electrically conductive internally, and are structurally and electrically connected, through properly sealed and insulated holes in the cover section 16, to the anode rod 54 and the cathode rod 56. Suitable supporting conductors can be made from steel bar, externally insulated with a rubber, plastic, or epoxy coating, with electrically conductive holes or sockets in the appropriate locations.

Figure 10:
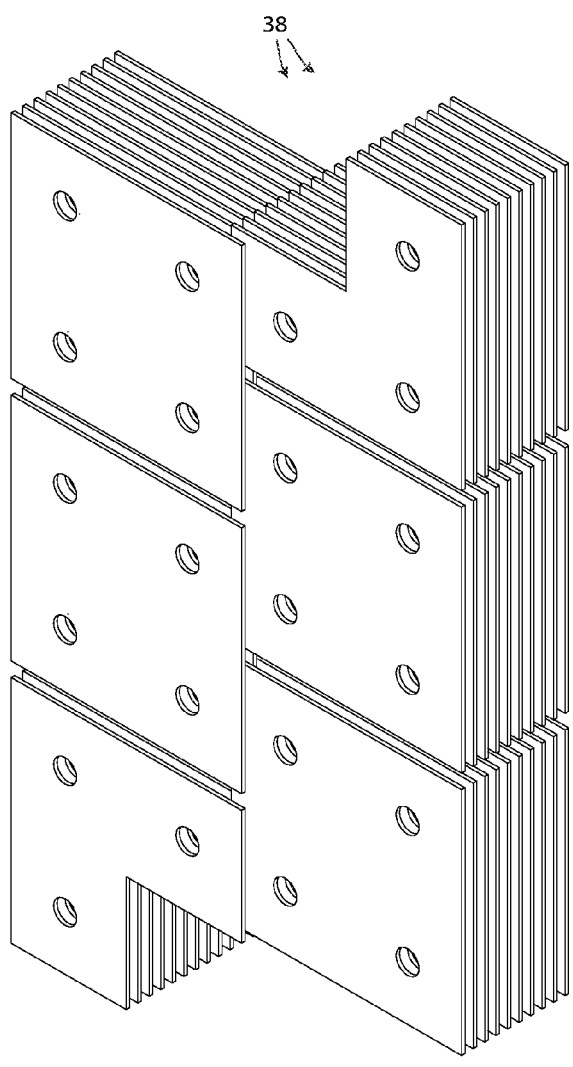
FIG. 10 is an exploded view of the electrolytic plate assembly of the hydrogen generator of an embodiment of the present invention.
Figure 11:
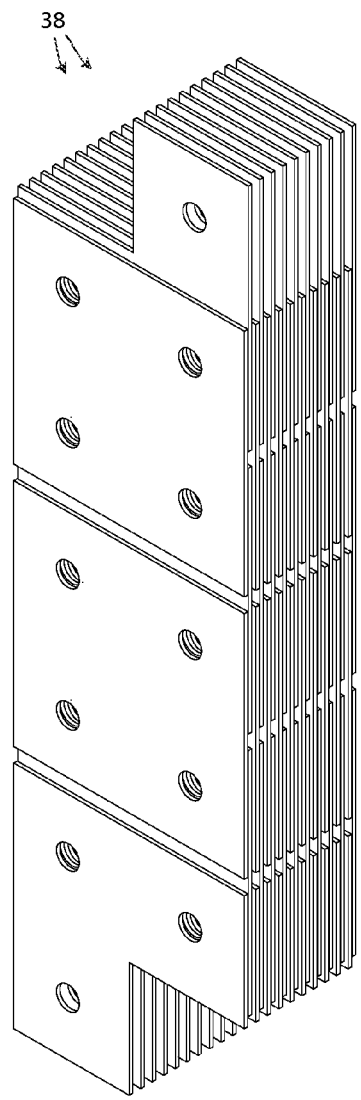
FIG. 11 is an assembled view of the electrolytic plate assembly of the hydrogen generator of an embodiment of the present invention.
Figure 12:
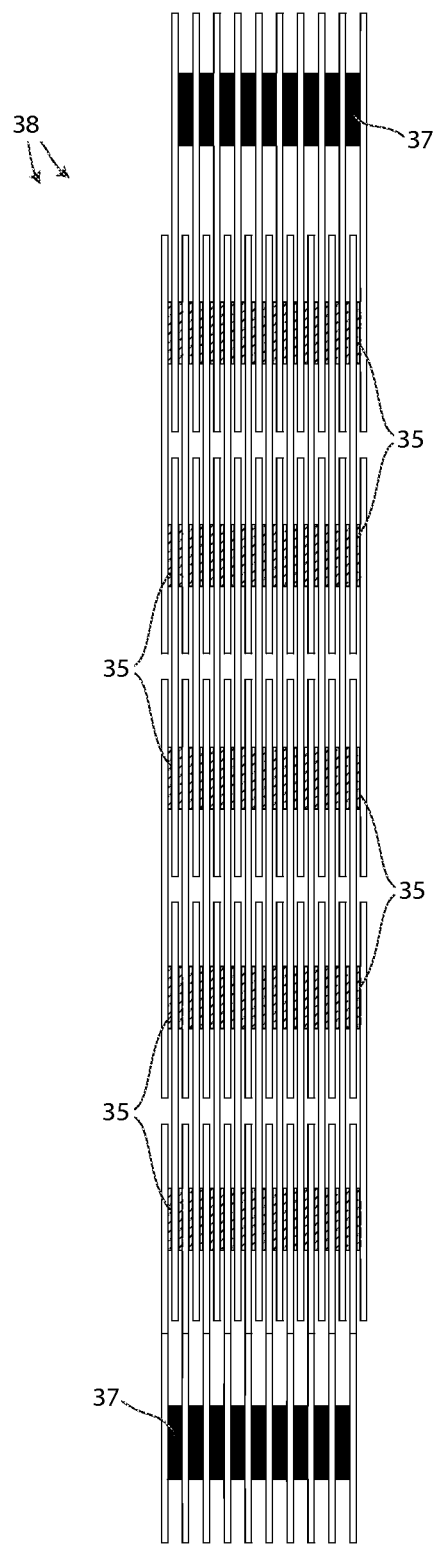
FIG. 12 is an elevation view of the electrolytic plate assembly of the hydrogen generator of an embodiment of the present invention.
Figure 13:
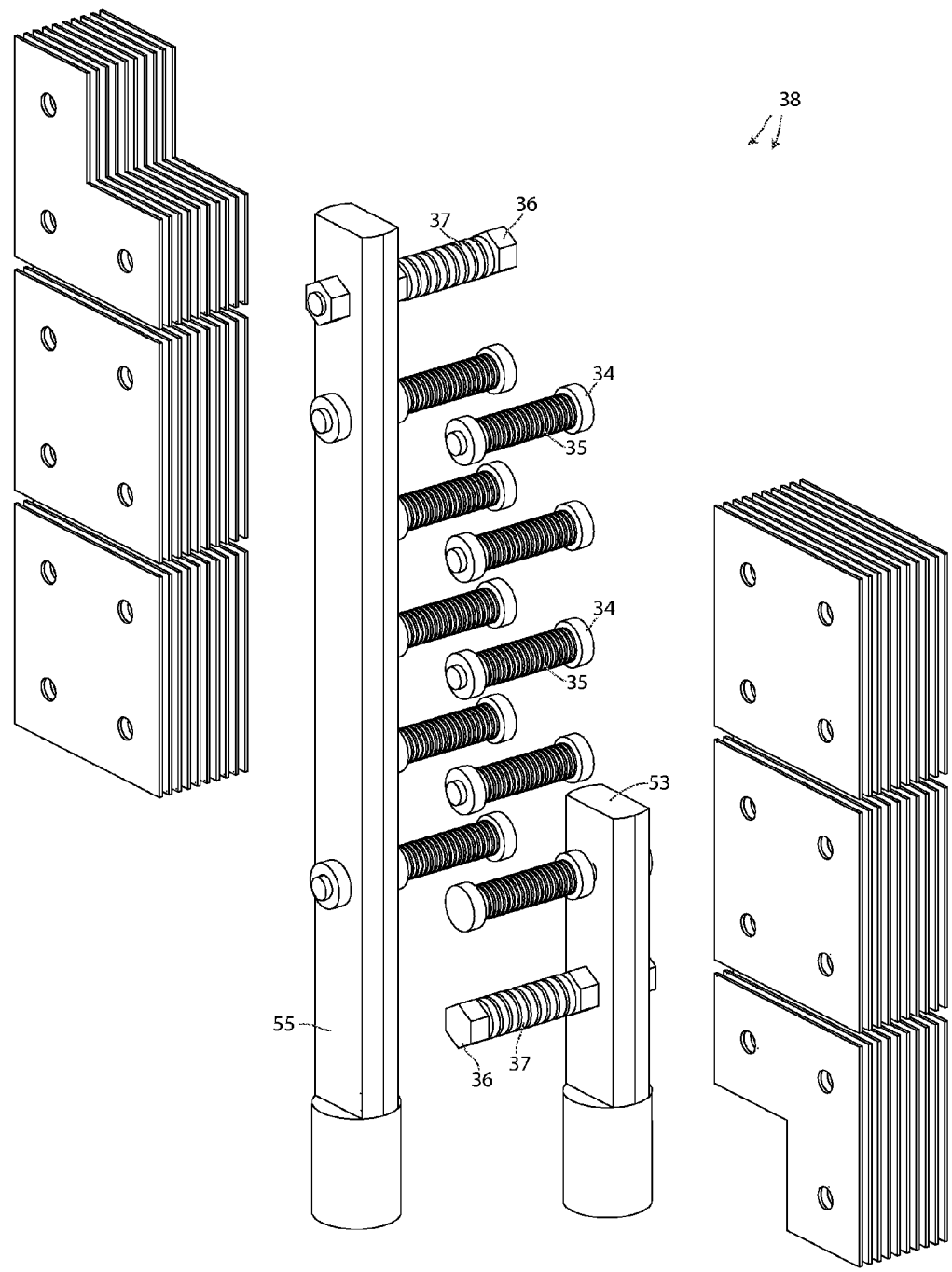
FIG. 13 is an exploded view of the internal structures of the hydrogen generator of an embodiment of the present invention.

Referring briefly to FIG. 10 & FIG. 11, in an embodiment, the electrolytic plate assembly 38 is constructed of metal plates of 306-grade stainless steel of 0.030-inch thickness, arranged in an interleaved fashion with the plates located close to, but not in contact with each other except as provided. Each plate has essentially equal or comparable vertical and horizontal dimensions as assembled. Each plate has a number of holes placed through it to allow for proper mounting. The holes are arranged so that there is an upper row and a lower row of holes, and so that when the plates are arranged in an interleaved, overlapping pattern, with the upper row of holes of some plates lined up with the lower rows of other plates, there will be a precise gap in the vertical dimension between adjacent ranks of plates. The greater number of plates do not have any section or quadrant cut out or removed, and a lesser number of plates have one quadrant removed creating plates having a protrusion or tab. The plates with the protrusions or tabs or cut-outs are the connected plates that will be electrically connected to the anode or cathode rods, and the wholes plates are the isolated plates that will not be electrically connected through any structure, but will instead interact only through the charged electrolyte solution. In a prototype, as shown, 60 essentially 2-inch-by-2-inch stainless steel plates are used, with 40 plates being square, and 20 plates having 1-inch-square cut-outs and being generally "L" shaped. The vertical gap between ranks of plates is 0.030 of an inch, and the horizontal gap between most of the plates is 0.020 of an inch, maintained by non-conducting spacers 35 or washers. When assembled, the plates are held together, at the proper distance apart, by non-conductive support members 34. The electrolytic plate assembly 38 is assembled with essentially half of the connected plates located at the top, having a nominally upward-facing projection, and the other half at the bottom, having a nominally downward-facing projection. The isolated plates are arranged in ranks, interleaved with, but not electrically contacting other isolated plates and the connected plates at the top and bottom, as shown.

The electrolytic plates can be made out of stainless steel or other suitable metals. Carbon graphite also makes an excellent electrolytic plate. As long as the sizes and shapes of the electrolytic plates are uniform in relation to each other, the exact size and shape of the plates are not critical, as long as sufficient surface area of the anode plates are located in close proximity to sufficient surface area of the cathode plates. The electrolytic plate assembly 38 as illustrated in the drawings are shown as a series of rectangular or square electrode plates although other configurations of the electrode assembly are possible. The electrolytic plate assembly 38 provides for a multi-cell bipolar electrode assembly for increased efficiency of the electrolysis reaction in the hydrogen generator 10 apparatus. The materials from which the electrolytic plates are made are selected to minimize the effects of different coefficients of expansion of the materials, withstand strong corrosive action of the electrolyte solution and provide effective and efficient electrolysis process. Thus, preferably, the electrolytic plates are made from a suitable stainless steel or carbon graphite material.

Referring to FIG. 8, FIG. 9, FIG. 12, & FIG. 13, the two ranks of connected plates at the top and the bottom of the assembly are connected structurally and electrically each to an appropriate supporting conductor 53, 55 which in turn are connected to an appropriate anode or cathode rod extending out of the generator housing 12 through the cover section 16. The structural and electrical connections are made with conductive support members 36 and conductive spacers 37. Electrically insulating materials 40 are used to insulate the passage of the anode rod 54 and the cathode rod 56 through the cover section 16, the outer surfaces of the anode supporting conductor 53 and the cathode supporting conductor 55, and the non-conductive support members 34 and non-conducting spacers 35. The conductive support members 36 can be metal bolts, and the conductive spacers can be metal washers of the proper thickness. The non-conductive support members 34 can be plastic or nylon bolts or rods, and the non-conductive spacers can be plastic or nylon washers of the proper thickness.

Figure 14:
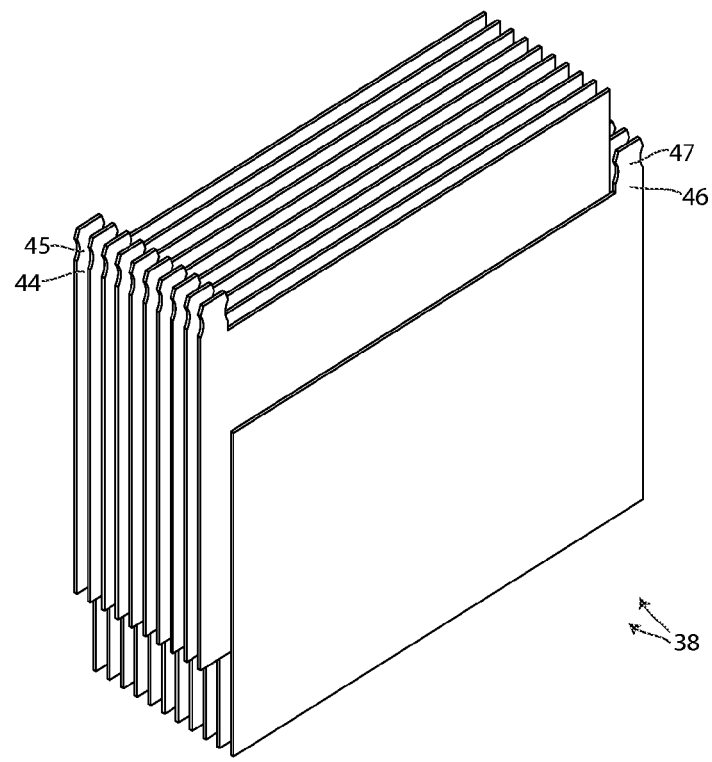
FIG. 14 is a perspective view of the arrangement of metal plates of the electrolytic plate assembly of the hydrogen generator of another embodiment of the present invention.
Figure 15:
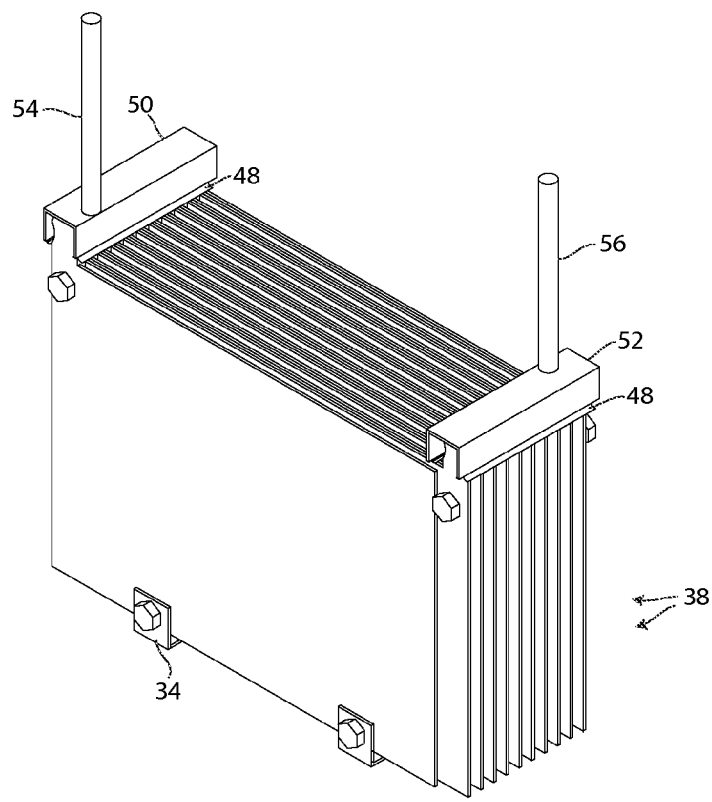
FIG. 15 is a perspective view of the electrolytic plate assembly of the hydrogen generator of another embodiment of the present invention.

Referring now to FIG. 14 & FIG. 15, in another embodiment, the electrolytic plate assembly 38 is constructed of metal plates arranged in an interleaved fashion with the plates located close to, but not in contact with each other except as provided. Each plate has a bottom edge and a top edge, and a short edge and a long edge. Along the long edge, the top edge has a projection 44, 46, and each projection has a narrowed part 45, 47. When assembled, the plates are held together, at the proper distance apart, by non-conductive support members 34. The electrolytic plate assembly 38 is assembled with essentially half of the plates having a nominally left-located projection 44, and the other half having a nominally right-located projection 46, interleaving the plates with each other as shown. When the plates are put in place, the left-located projections 44 and narrowed parts 45 line up with each other, and the right-located projections 46 and narrowed parts 47 line up with each other. An electrical-contact member 48, one for the left and another for the right, fits into and makes electrical contact with the narrowed parts 45, 47 of every other plate in the assembly, bringing all of the left-located, and all of the right-located plates into electrical contact with all of the other same-located plates. Therefore all of the left-located plates function as a first single electrode, and all of the right-located plates function as a separate second single electrode. The first and second electrodes are closely interleaved with each other, but are not in electrical contact with each other.

An elongated cap 50 fits over the tops of the projections 44, and a similar elongated cap 52 fits over the tops of the projections 46. The caps 50, 52 cover and protect most of the electrical-contact members 48. Where the left-located plates are arbitrarily assigned to be the anode, an anode rod 54 is secured to the left elongated cap 50, and a cathode rod 56 is secured to the right elongated cap 52. The anode rod 54 and cathode rod 56 are intended to protrude from the top of the hydrogen generator 10 unit and provide the electrical-connection points for the hydrogen generator 10 within the hydrogen-generating-and-control system 100.

The electrical-contact members 48 can be formed from stainless steel finger stock.

Figure 16:
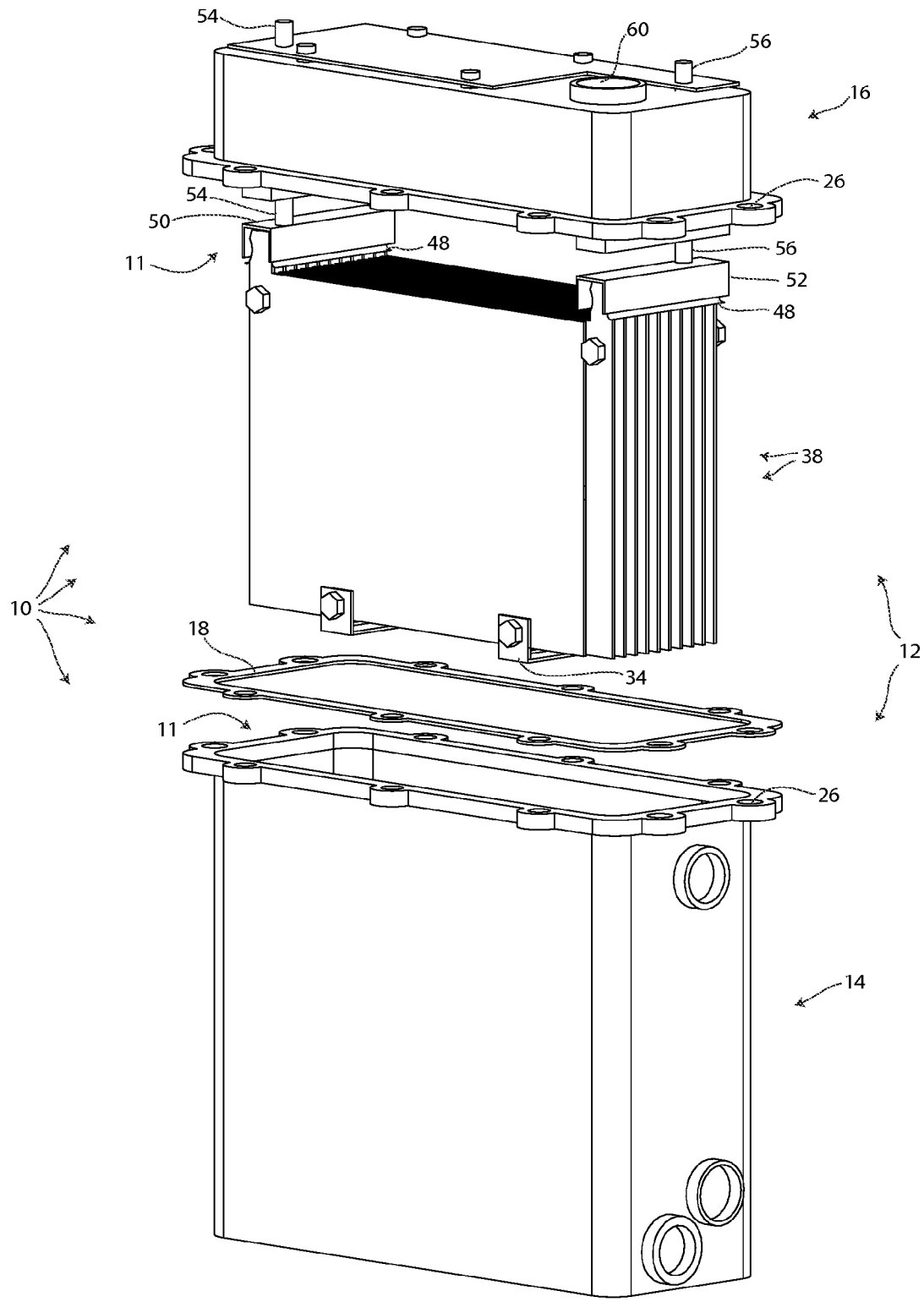
FIG. 16 is an exploded view of another embodiment of the hydrogen generator of the present invention.
Figure 17:
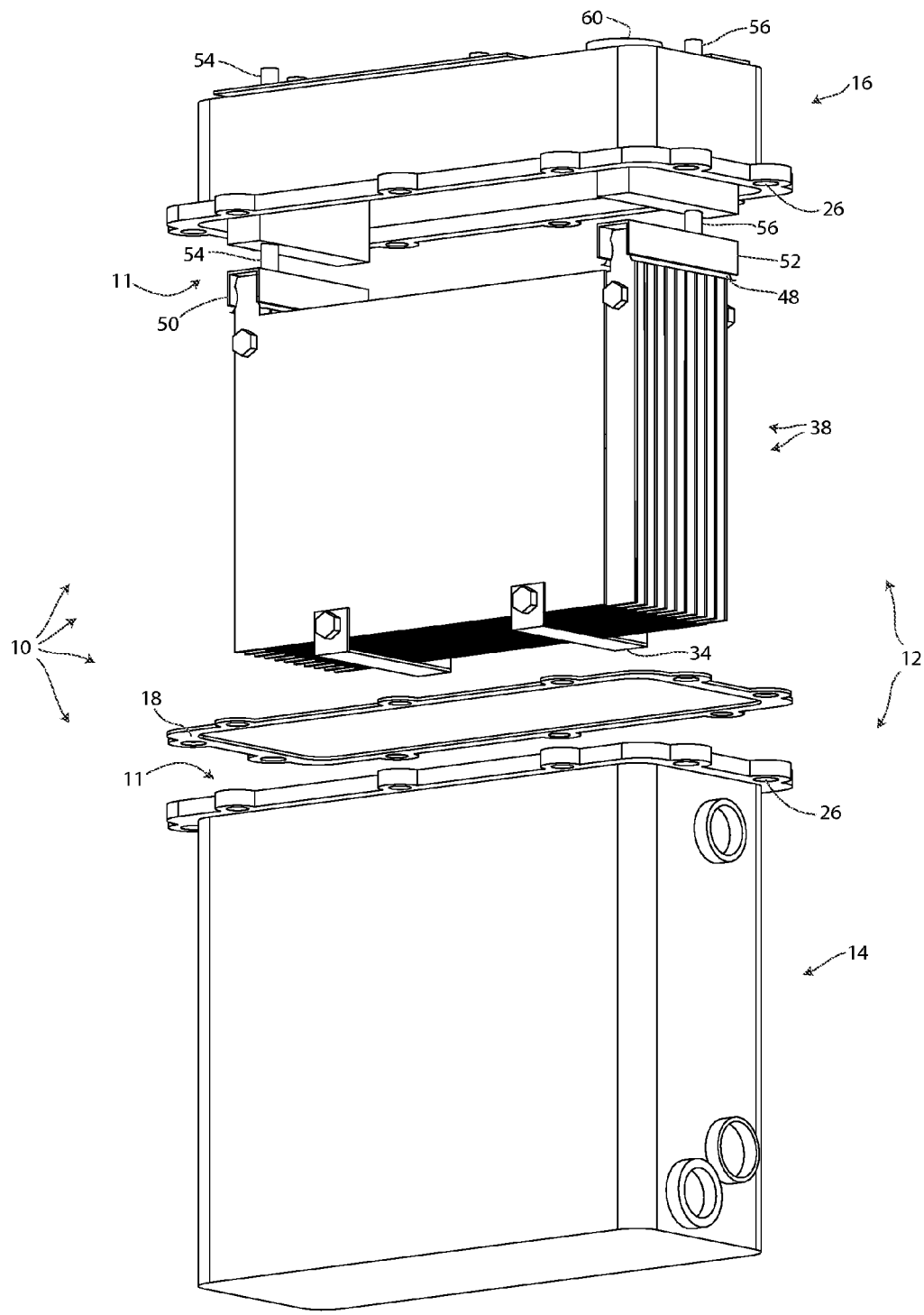
FIG. 17 is another exploded view of another embodiment of the hydrogen generator of the present invention.

Referring now to FIG. 16 & FIG. 17, exploded views of the other embodiment of the complete hydrogen generator 10 apparatus, the electrolytic plate assembly 38 is contained within a generator housing 12 having a base section 14 and a cover section 16 with a gasket 18 between, and securely joined together through joining structures 26 which allow for disassembly and re-assembly when needed. The housing 12 can be formed from a material with sufficient mechanical strength and with sufficient corrosion resistance to the internal electrolytes and gasses and to the external conditions of a vehicle's engine compartment. Use of non-conductive material such as fiberglass or plastics will result in a self-insulating housing. Use of conductive material such as stainless steel for the housing will require the proper insulating materials and structures to be provided to prevent malfunction.

When assembled, the generator housing 12 defines an inner chamber 11 that is capable of holding water-electrolyte and holding hydrogen gas under pressure. The hydrogen gas will separate from and rise above the water-electrolyte and will occupy the top portion of the inner chamber 11.

Figure 18:
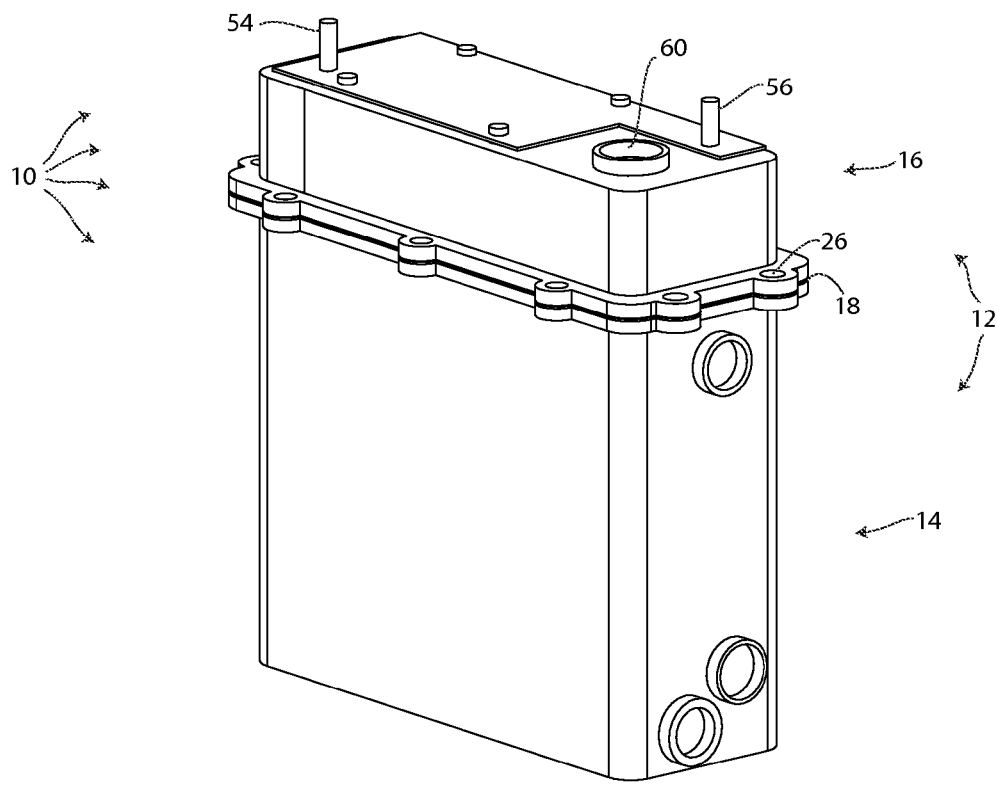
FIG. 18 is a perspective view of another embodiment of the hydrogen generator of the present invention.

Referring additionally to FIG. 18, the top of the cover section 16 of the housing 12 has a gas outlet 60 through which generated hydrogen gas is sent via the hydrogen conduit 62 to the hydrogen injector 64. Other inlets and outlets are provided for circulating water through the hydrogen generator 10 and for attachment of sensors and controls as set forth herein. The anode rod 54 and the cathode rod 56 protrude through the housing 12, allowing electrical connection of the hydrogen generator 10 unit to the hydrogen-generating-and-control system 100 installed in a vehicle. In an illustrated embodiment, the anode and cathode rods protrude through the top of the housing 12, which is a convenient and accessible location for the embodiment. The anode and cathode rods could be placed in other locations relative to the housing.

Figure 19:
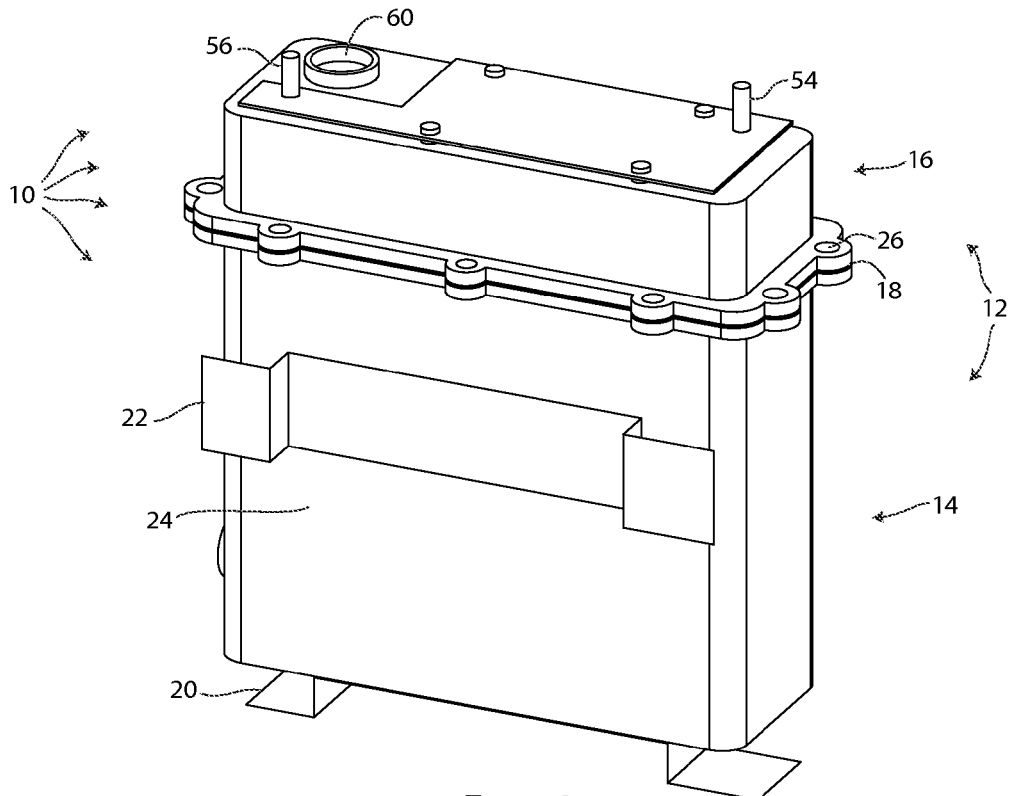
FIG. 19 is a perspective back view of another embodiment of the hydrogen generator of the present invention, showing mounting structures.

Referring additionally to FIG. 19, the hydrogen generator 10 can be provided with mounting brackets 20, 22 attached at the bottom or at the nominal back side 24 of the housing 12, in order to facilitate mounting of the hydrogen generator near a vehicle's engine.

Referring again to FIG. 1, in use, the hydrogen generator 10 of the invention is electrically connected to the vehicle through the anode rod 54, which is connected ultimately to the positive (+) side of the vehicle's battery, and the cathode rod 56, which is connected ultimately to the negative (−) common chassis ground. The inner chamber 11 of the housing 12 contains sufficient water to cover the electrolytic plate assembly 38, leaving space above the water into which generated hydrogen gas will rise and concentrate. Inside the housing 12, the anode rod 54 is electrically connected to the anode group of electrolytic plates through the elongated cap 50 and the corresponding electrical-contact member 48, and the cathode rod 56 is electrically connected to the cathode group of electrolytic plates through the elongated cap 52 and the corresponding electrical-contact member 48. When electric current is applied, hydrogen gas is generated by electrolytic action, and the generated hydrogen gas rises to the top portion of the inner chamber 11, above the water, from where it exits the generator housing and is conveyed by the hydrogen conduit 62 to the hydrogen injector 64, which can optionally be configured as a single injector or as multiple separate injectors in embodiments appropriate for different engines fuel-intake systems. The hydrogen injector 64 injects generated hydrogen gas either into an intake manifold or directly into combustion cylinders of the vehicle's engine 200, providing a more complete, efficient, and environmentally cleaner combustion of the engine's main fuel.

The hydrogen-generating-and-control system 100 of the invention controls the operation of the hydrogen generator 10 in order to ensure safe operations at optimal levels. A system controller 110, receives signals from and sends signals to a variety of sensors and actuators or relays, through a controller manifold 111. The system controller 110 makes adjustments to the operation of the hydrogen generator in light of information provided automatically by a variety of sensors, and information provided by an operator through an in-cab console 114 or a remote device 130 such as a smartphone or a tablet computer. The system controller 110 also displays information on an in-cab display 128 or a remote device 130. The capability of communicating through a remote device 130 is provided by an optional radio-frequency (RF) communications unit 129, such as a transceiver for cellular telephone or satellite communications services.

The system controller 110 communicates with the hydrogen injector 64, activating the injector or separate divisions of the injector at the proper times relative to combustion timing, and monitoring the conditions at the injector location. Optionally, the hydrogen injector 64 can be provided with a vacuum sensor to supplement data obtained through other sensors.

The system controller 110 communicates with the engine control unit (ECU) 202 and onboard diagnostic system (OBD) of the vehicle's engine. Some of the ECU-OBD sensor data relevant to operation of the hydrogen generator 10 are crankshaft position (or tachometer), air-fuel ratio, timing, mass air flow, oxygen, and knock. In embodiments where the hydrogen generator is driven by the vehicle's main electrical system and battery, the vehicle's data re the electrical system is also relevant.

The system controller 110 receives data from sensors in or on the hydrogen generator 10 housing 12, including a water-level high-low sensor 106 monitoring whether the generator is under-filled or over-filled, a gas-pressure sensor 116 monitoring the pressure at the entrance to the hydrogen conduit 62, and a generator temperature sensor 118 monitoring the temperature inside the housing.

The system controller 110 sends control signals to start, speed, slow, or stop the flow of electric current into, and water into or out of, the hydrogen generator 10, as a means of controlling and regulating the generation of additional hydrogen gas by electrolysis.

The supply of electric current to the hydrogen generator 10 is controlled through the current-in relay 91, where the current supplies the voltage to drive the electrolysis reaction and produces more hydrogen gas. The presence of heat is beneficial to the electrolysis of water, and the higher the heat, the less voltage is required to produce a unit of hydrogen gas. Therefore the system controller 110 must account for the temperature reported by the generator temperature sensor 118 in calculating when and how much current to send into the hydrogen generator.

The electrolysis of water into hydrogen gas and oxygen consumes water, which must be replenished. It is estimated that a typical embodiment of the hydrogen generator will use 8 to 9 cups of water during 10 hours of operation. Optimally the water-electrolyte level should be kept above the top of the electrolytic plate assembly 38. Although the common electrolyte salt sodium chloride (NaCl) would produce chlorine gas and would be consumed, other electrolytes are available which will not be consumed but will become more concentrated as the water is consumed. In an embodiment using a consumable electrolyte, the hydrogen generator 10 is replenished with a water and electrolyte mixture. In an embodiment using a non-consumable electrolyte, the hydrogen generator 10 is replenished with plain water, which will dilute the concentrated electrolyte remaining in the generator.

Water is supplied to the hydrogen generator 10 from a water reservoir 82, through a water line 83, having a check valve 88 to prevent backflow. A reservoir high-low sensor 119, monitored by the system controller 110, is provided for the water reservoir 82. The system controller 110 monitors the hydrogen generator's water-level high-low sensor 106 and activates the water-in relay 92 which in turn activates the water pump 86 and the water-in valve 87, adding water to the hydrogen generator 10 and stopping when a proper water level is reached.

When water-electrolyte needs to be removed from the hydrogen generator 10, the system controller 110 activates the water-out relay 93, which in turn activates the water-out valve 89, releasing water-electrolyte from the housing 12 of the hydrogen generator 10. Depending upon the specific electrolyte or electrolytes used in a given embodiment, the released water-electrolyte can be recirculated and reused, sent to a storage tank for later removal and possible recovery, sent to a filter or evaporator for further processing, or dumped to the outside environment.

In use, the system controller 110 determine's the engine's need for hydrogen gas based primarily on data received from the vehicle's ECU-OBD 202, either under a standard set of operational parameters or under parameters modified by an operator using the in-cab console 114 or a remote device 130 such as a smartphone or a tablet computer. The system controller obtains the pressure of the generated hydrogen gas in the inner chamber 11 near the gas outlet 60 and entering the hydrogen conduit 62. If more hydrogen gas needs to be generated, and if such generation will not push the system over any safety limit or operational limit, the system controller 110 will activate the current-in relay 91, sending an appropriate electric current into the hydrogen generator 10 and generating more hydrogen gas.

At the hydrogen injector 64, generated hydrogen gas in the hydrogen conduit 62 is injected either into an intake manifold 201 or directly into the cylinders of the engine 200 as disclosed herein, under the control of the system controller 110 and in coordination with real-time data received from the vehicle's ECU-OBD 202. The hydrogen injector 64 provides feedback to the system controller 110 indicating successful injection of the generated hydrogen gas and the flow rate of the generated hydrogen gas into the engine, and, optionally, additional data from optional sensors in the hydrogen injector.

Typical operating pressure in a typical embodiment of the hydrogen generator will be in the approximate range 100-200 p.s.i., with pressures significantly below that being too weak to be injected into the engine effectively, and pressures significantly above that causing potential mechanical failure, leakage, or explosion. To some extent, a buildup of hydrogen gas pressure will affect the equilibrium of the electrolysis reaction and will be self-limiting, as long as the system controller 110 does not improperly try to compensate by increasing the electric current, and ultimately the voltage, driving the electrolysis. Because the electrolysis of water, using the proper electrolyte(s), requires an input of energy in the form of a combination of voltage and heat, the reaction is unlikely to run away as long as the system controller 110 is sophisticated enough to avoid over-application of electric current, and as long as safety measures to force a shutdown of electric current to the hydrogen generator are provided.

Regarding safety, the gas-pressure sensor 116 can optionally be adapted to serve as a pressure-release valve to prevent unsafe pressure in the inner chamber 11 of the hydrogen-generator housing 12. Otherwise, a separate pressure-release valve can be provided. Such a pressure-release valve is likely to release extremely reactive and explosive hydrogen gas, so it should not be vented directly into the vehicle's engine compartment, but might be routed to a storage vessel or to a filter or catalytic converter for neutralization. An alternative way of lowering potentially dangerous gas pressures in the inner chamber 11 is to release water-electrolyte from the hydrogen-generator housing 12 through the water-out valve 89 as disclosed. The resulting purging of water-electrolyte from the hydrogen-generator housing 12 would also serve to immediately halt the generation of any further hydrogen gas. No matter which method of emergency lowering of gas pressure is implemented, the electric current supplied to the hydrogen generator 10 should be immediately halted upon the approach of dangerously high gas pressure, to halt the generation of any further hydrogen gas.

The generator temperature sensor 118 can also serve as a safety monitor and control, halting the flow of electric current into the hydrogen generator 10 and therefore halting the further generation of hydrogen gas. Otherwise, a separate thermal sensor and cut-off switch can be provided.

The in-cab display 128 and the in-cab console 114 allow an operator to observe and influence the operation of the hydrogen generator 10 and the hydrogen-generating-and-control system 100. Optionally, the display and console functions can be implemented on a remote device 130 such as a smartphone or a tablet computer. Such an implementation could be in the form of an "app" for a standard smartphone or tablet, an application program for a larger computer, or could be a standalone remote controller. The optional provision of a radio-frequency (RF) communications unit 129, such as a transceiver for cellular telephone or satellite communications services, with the system controller 110, allows for such remote control, ranging from technically remote control and monitoring from within the vehicle itself to remote control and monitoring from far away via a network connection.

Many changes and modifications can be made in the present invention without departing from the spirit thereof. I therefore pray that my rights to the present invention be limited only by the scope of the appended claims.

I claim:

1. A method for controlling the safe generation and use of hydrogen gas in motor vehicles, comprising:
   (i) providing a hydrogen-generating-and-control system, comprising:
      (a) a hydrogen generator having an inner chamber adapted to contain a water and electrolyte solution in a lower portion and accumulated hydrogen gas in an upper portion of said inner chamber, an electrolytic plate assembly contained within said lower portion and covered by said water and electrolyte solution during operation, and having an anode rod and a cathode rod both adapted to provide points of electrical contact with said electrolytic plate assembly, and a gas outlet in said upper portion adapted to release generated hydrogen gas for injection into the internal combustion engine;
      (b) a hydrogen injector adapted to inject generated hydrogen gas into the engine;
      (c) a hydrogen conduit adapted to convey generated hydrogen gas under pressure from said gas outlet to said hydrogen injector;
      (d) a source of electric current;
      (e) a current-in relay adapted to provide a controlled amount of said electric current across said anode rod and said cathode rod;
      (f) a water reservoir having a water line having a water pump and a water-in valve, adapted to replenish water into said hydrogen generator;
      (g) a water-in relay adapted to provide controlled replenishment of water to said hydrogen generator by controlled activation of said water pump and water-in valve;
      (h) a water-out valve adapted to release water and electrolyte from said hydrogen generator;
      (i) a water-out relay adapted to provide controlled release of water and electrolyte from said hydrogen generator by controlled activation of said water-out valve;
      (j) a pressure sensor monitoring pressure of generated hydrogen gas at said gas outlet;

(k) a water-level high-low sensor monitoring level of water and electrolyte covering said electrolytic plate assembly within said lower portion of said hydrogen generator;

(l) a generator temperature sensor monitoring the temperature inside said upper portion of said hydrogen generator; and (m) a system controller adapted to:
- (1) receive data from said pressure sensor, water-level high-low sensor, and generator temperature sensor, and from the vehicle's engine control unit;
- (2) control the activation of said hydrogen injector to inject generated hydrogen gas into the engine;
- (3) control the activation of said current-in relay to control the electrolytic generation of hydrogen gas; and
- (4) control the activation of said water-in relay and said water-out relay to control water-and-electrolyte level and replenishment of water to said hydrogen generator;

where said system controller:
- (1) activates said hydrogen injector according to operational parameters determined from data provided by the vehicle's engine control unit;
- (2) activates said current-in relay according to operational parameters determined from data provided by said pressure sensor, water-level high-low sensor, and generator temperature sensor;
- (3) activates said water-in relay and water-out relay according to operational parameters determined from data provided by said pressure sensor, water-level high-low sensor, and generator temperature sensor; and where said system controller provides for safe, efficient, and clean operation of said hydrogen-generating-and-control system;

(ii) mounting said hydrogen-generating-and-control system in the vehicle;

(iii) setting the operational parameters of said hydrogen-generating-and-control system in accord with the characteristics of the vehicle and engine and the operating conditions;

(iv) providing said hydrogen-generating-and-control system with water, electrolyte, and a source of electric current; and (v) activating said hydrogen-generating-and-control system.

2. The method of claim 1, where said hydrogen-generating-and-control system further comprises a controller manifold.

3. The method of claim 1, where said hydrogen-generating-and-control system further comprises an in-cab display.

4. The method of claim 1, where said hydrogen-generating-and-control system further comprises an in-cab console.

5. The method of claim 1, where said hydrogen-generating-and-control system further comprises a remote device.

6. The method of claim 1, where said hydrogen-generating-and-control system further comprises a radio-frequency communications unit.

7. The method of claim 1, where said water reservoir further comprises a water-level high-low sensor.

8. The method of claim 1, where said water line further comprises a one-way check valve.

9. The method of claim 1, where said system controller prevents the occurrence of unsafe operating conditions and disables said hydrogen generator upon detection of unsafe operating conditions.

\* \* \* \* \*